(12) United States Patent
Kincaid et al.

(10) Patent No.: US 8,091,960 B2
(45) Date of Patent: Jan. 10, 2012

(54) SEAT ASSEMBLY HAVING SEAT HEATING AND OCCUPANT DETECTION

(75) Inventors: Kevin D. Kincaid, Kokomo, IN (US); Robert K. Constable, Kokomo, IN (US); Dennis P. Griffin, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 341 days.

(21) Appl. No.: 12/433,923

(22) Filed: May 1, 2009

(65) Prior Publication Data

US 2009/0295199 A1    Dec. 3, 2009

Related U.S. Application Data

(60) Provisional application No. 61/126,120, filed on May 1, 2008.

(51) Int. Cl.
*A47C 7/72* (2006.01)
*H05B 1/00* (2006.01)

(52) U.S. Cl. ............. 297/180.12; 297/217.2; 297/217.3; 219/202; 219/217; 219/481

(58) Field of Classification Search ............... 297/180.1, 297/180.12, 217.2, 217.3; 219/200, 202, 219/212, 217, 480–488, 496, 497, 518, 528, 219/529, 538, 552–553
See application file for complete search history.

(56) References Cited

U.S. PATENT DOCUMENTS

| | | | |
|---|---|---|---|
| 4,885,566 A | 12/1989 | Aoki et al. | |
| 4,926,025 A * | 5/1990 | Wilhelm | 219/202 |
| 5,525,843 A * | 6/1996 | Howing | 307/9.1 |
| 5,914,610 A | 6/1999 | Gershenfeld et al. | |
| 6,140,622 A * | 10/2000 | Goings et al. | 219/506 |
| 6,161,070 A | 12/2000 | Jinno et al. | |
| 6,179,378 B1 | 1/2001 | Baumgartner et al. | |
| 6,283,504 B1 * | 9/2001 | Stanley et al. | 280/735 |
| 6,369,468 B1 * | 4/2002 | Goings et al. | 307/125 |
| 6,556,137 B1 | 4/2003 | Oka et al. | |
| 6,559,555 B1 | 5/2003 | Saitou et al. | |
| 6,644,689 B2 | 11/2003 | Murphy | |
| 6,696,948 B2 | 2/2004 | Thompson et al. | |
| 6,703,845 B2 * | 3/2004 | Stanley et al. | 324/663 |

(Continued)

FOREIGN PATENT DOCUMENTS

WO    WO 95/13204    5/1995

(Continued)

OTHER PUBLICATIONS

Pending U.S. Appl. No. 12/150,439, filed Apr. 28, 2008.

(Continued)

*Primary Examiner* — David Dunn
*Assistant Examiner* — Philip Gabler
(74) *Attorney, Agent, or Firm* — Lawrence D. Hazelton

(57) ABSTRACT

A seat assembly including a seat cushion, a heating element, a heating circuit, a occupant sensing circuit, and an isolation circuit. The seat cushion has a seating surface, the heating element is adjacent the seating surface and is formed of electrically conductive material. The heating circuit is coupled to the heating element for supplying electrical current to the heating element for generating heat. The occupant sensing circuit is also coupled to the heating element for sensing the presence of an occupant near the heating element. The isolation circuit is interposed between the heating circuit and the heating element for isolating the heating circuit from the occupant sensing circuit.

15 Claims, 4 Drawing Sheets

U.S. PATENT DOCUMENTS

| | | |
|---|---|---|
| 6,816,077 B1 | 11/2004 | Shieh et al. |
| 6,877,606 B2 | 4/2005 | Hardy |
| 6,960,841 B2 | 11/2005 | Saitou et al. |
| 7,048,338 B2 | 5/2006 | Pinkos |
| 7,084,763 B2 | 8/2006 | Shieh et al. |
| 7,102,527 B2 | 9/2006 | Shieh et al. |
| 7,151,452 B2 | 12/2006 | Shieh |
| 7,194,346 B2 | 3/2007 | Griffin et al. |
| 7,521,940 B2 * | 4/2009 | Koch et al. .................. 324/661 |
| 7,688,204 B2 * | 3/2010 | Yamanaka et al. ............ 340/562 |
| 2004/0111201 A1 | 6/2004 | Thompson et al. |
| 2005/0253712 A1 | 11/2005 | Kimura et al. |
| 2006/0187038 A1 | 8/2006 | Shieh et al. |

FOREIGN PATENT DOCUMENTS

| | | |
|---|---|---|
| WO | WO9513204 | 5/1995 |
| WO | WO2007/089654 | 8/2007 |

OTHER PUBLICATIONS

Pending U.S. Appl. No. 12/432,975, filed Apr. 30, 2009.
Pending U.S. Appl. No. 12/433,011, filed Apr. 30, 2009.
Pending U.S. Appl. No. 12/434,079, filed May 1, 2009.
Pending U.S. Appl. No. 12/433,993, filed May 1, 2009.

* cited by examiner

SEAT ASSEMBLY HAVING SEAT HEATING AND OCCUPANT DETECTION

RELATED APPLICATIONS

This application claims the benefit of U.S. Provisional Application No. 61/126,120 filed May 1, 2008.

TECHNICAL FIELD OF INVENTION

The invention relates to a seat assembly having an occupant detection circuit. More particularly, this invention relates to such seat assembly comprising a seat heating element and an occupant detection circuit, wherein the occupant detection circuit is electrically isolated from the seat heating circuit during occupant sensing.

BACKGROUND OF INVENTION

It has been proposed to place electrically conductive material in a seat as a sensor for detecting the presence of an occupant in the seat. For example, U.S. patent application Ser. No. 12/150,439, incorporated herein by reference, describes an occupant detector for a vehicle seat assembly that includes an occupant sensing circuit that measures the impedance of an electric field generated by applying an electric signal to the sensor in the seat. The presence of an occupant affects the electric field impedance about the sensor and is measured by the occupant sensing circuit. In seats equipped with a heating element, the electrically conductive material of the heating element may also serve as the sensor for occupant sensing. Such an arrangement might operate by periodically disconnecting a heating current source from the heating element and connecting the occupant detection circuit. Because of the sensitivity of the measurements required by the occupant sensing circuit, it is necessary to isolate the heating current source from the heating element to prevent interference with the occupant sensing circuit. If the heating control circuit has open-switch impedance that combines with and influences the electric field impedance, the accuracy and reliability of occupant detection is reduced.

It has been proposed to use transistors for connecting and disconnecting heating current to and from the heating element. Even when the transistors are off to disconnect the heating current, the transistors have open-switch impedance that remains coupled to the heating element. Thus, the heating element is not isolated, and the occupant sensing circuit measurement is affected. The effect of the transistor open-switch impedance on the occupant sensing circuit may be reduced by adding diodes in series with the transistors. However, this increases circuit complexity and does not entirely eliminate open-switch impedance because of diode leakage or diode junction capacitance. Moreover, mechanical relays for connecting and disconnecting the heating current comprise relay contacts and interconnecting wires that add open-switch impedance to the occupant sensing circuit, as well as adding to the expense, noise and reliability of the circuit.

What is needed is a seat assembly having occupant detection circuit and seat heating circuit using the same heating element for seat heating and occupant sensing, which uses transistors for heater current control and isolates the transistor open-switch impedance from the occupant detection circuit, thereby minimizing the effect upon occupant detection measurement.

SUMMARY

An embodiment of a seat assembly described herein includes a seat cushion, a heating element, a heating circuit, an occupant sensing circuit, and an isolation circuit. The seat cushion has a seating surface. The heating element is adjacent the seating surface and is formed of electrically conductive material. The heating circuit is coupled to the heating element for supplying electrical current to the heating element effective for generating heat on the seating surface. The occupant sensing circuit is coupled to the heating element and is effective for sensing the presence of an occupant near the heating element. The isolation circuit is interposed between the heating circuit and the heating element and the isolation circuit is effective for isolating the heating circuit from the occupant sensing circuit.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
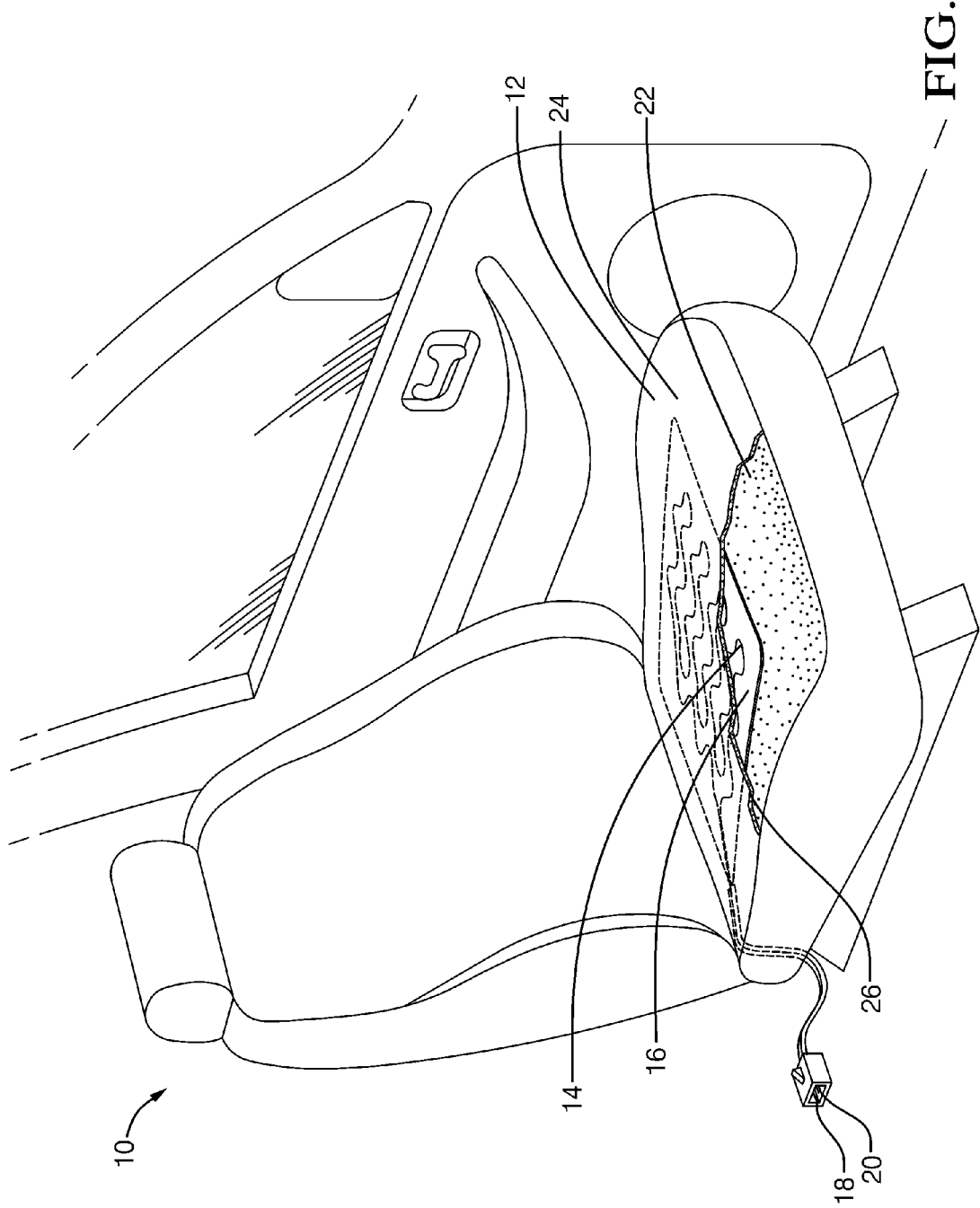
FIG. 1 is a perspective view of a seat assembly.
Figure 2:
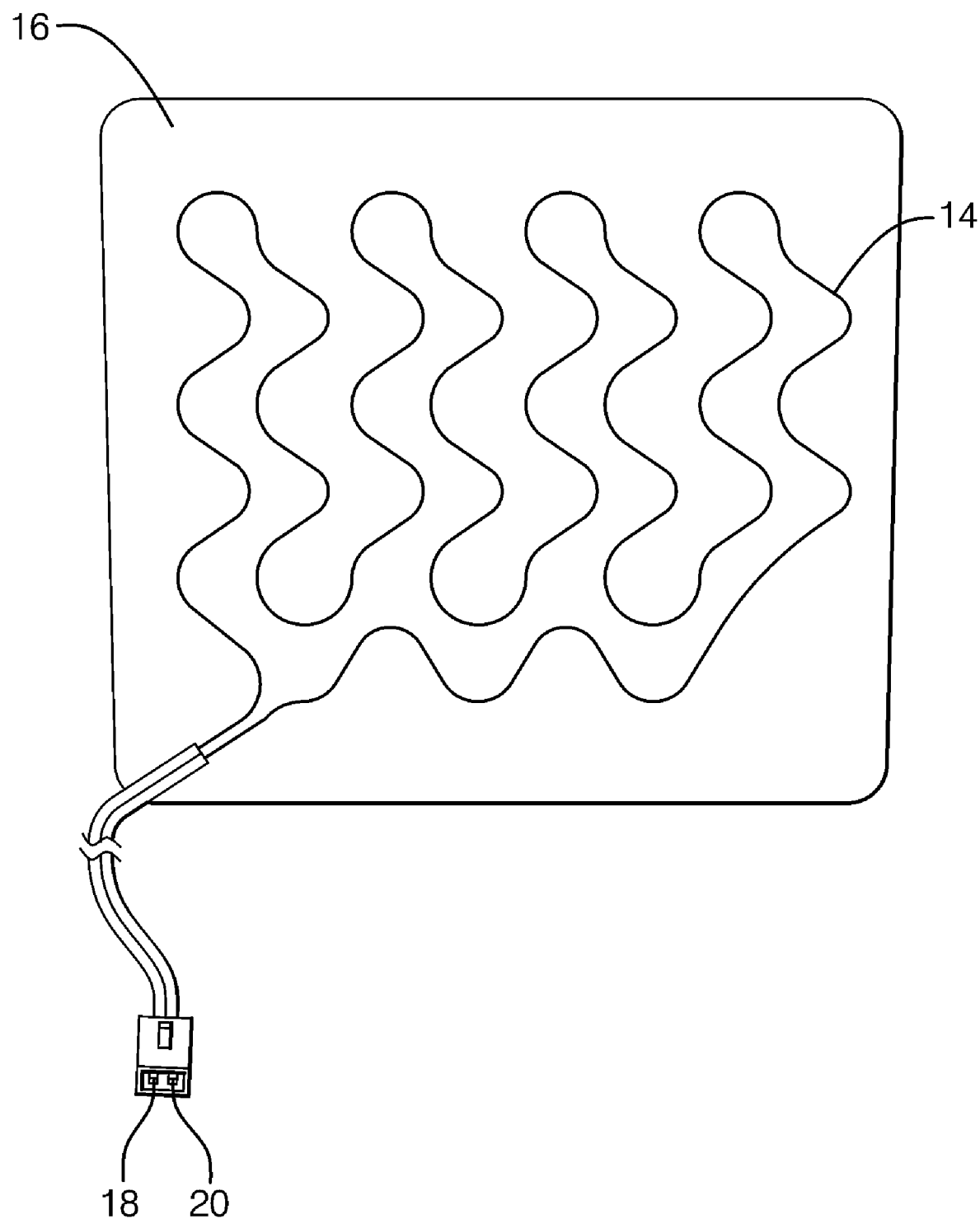
FIG. 2 is a top view of a mat.

In accordance with an embodiment of seat assembly, FIG. 1 shows seat assembly 10 in a vehicle passenger compartment having seat cushion 12 providing seating surface 24 for supporting an occupant. Within seat cushion 12 is cushion 22 typically made of foam and determining the size and shape of seat cushion 12. Adjacent seating surface 24 is mat 16 having heating element 14 attached to mat 16. Mat 16 with heating element 14 is shown in more detail in FIG. 2. The heating element can be made of any electrically conductive material capable of surviving the stress and strain of being adjacent a seating surface and providing sufficient resistance to electrical current to generate a quantity of heat effective to warm the seating surface. Exemplary forms of heating elements include metal wire, conductive fiber, metal foil, and metal ribbon. Cushion 22 is covered with covering 26 to protect the foam forming cushion 22, protect heating element 14, and to make the appearance of seat assembly 10 attractive. Mat 16 is depicted in FIG. 1 arranged between cushion 22 and covering 26, thereby making a simple to manufacture seat assembly. Positioning heating element 14 near seating surface 24 promotes heat transmission from heating element 14 through the covering and to the seating surface, thereby improving occupant comfort when seat heating is desired. The positioning of the heating element near the seating surface also improves occupant detection sensitivity and accuracy of detecting an occupant near seating surface 24 by maximizing the electrical field coupling to the occupant. The ends of heating element 14 are terminated with a first terminal 18 and second terminal 20, so are readily connected to the rest of the occupant detection/seat heating system.

Figure 3:
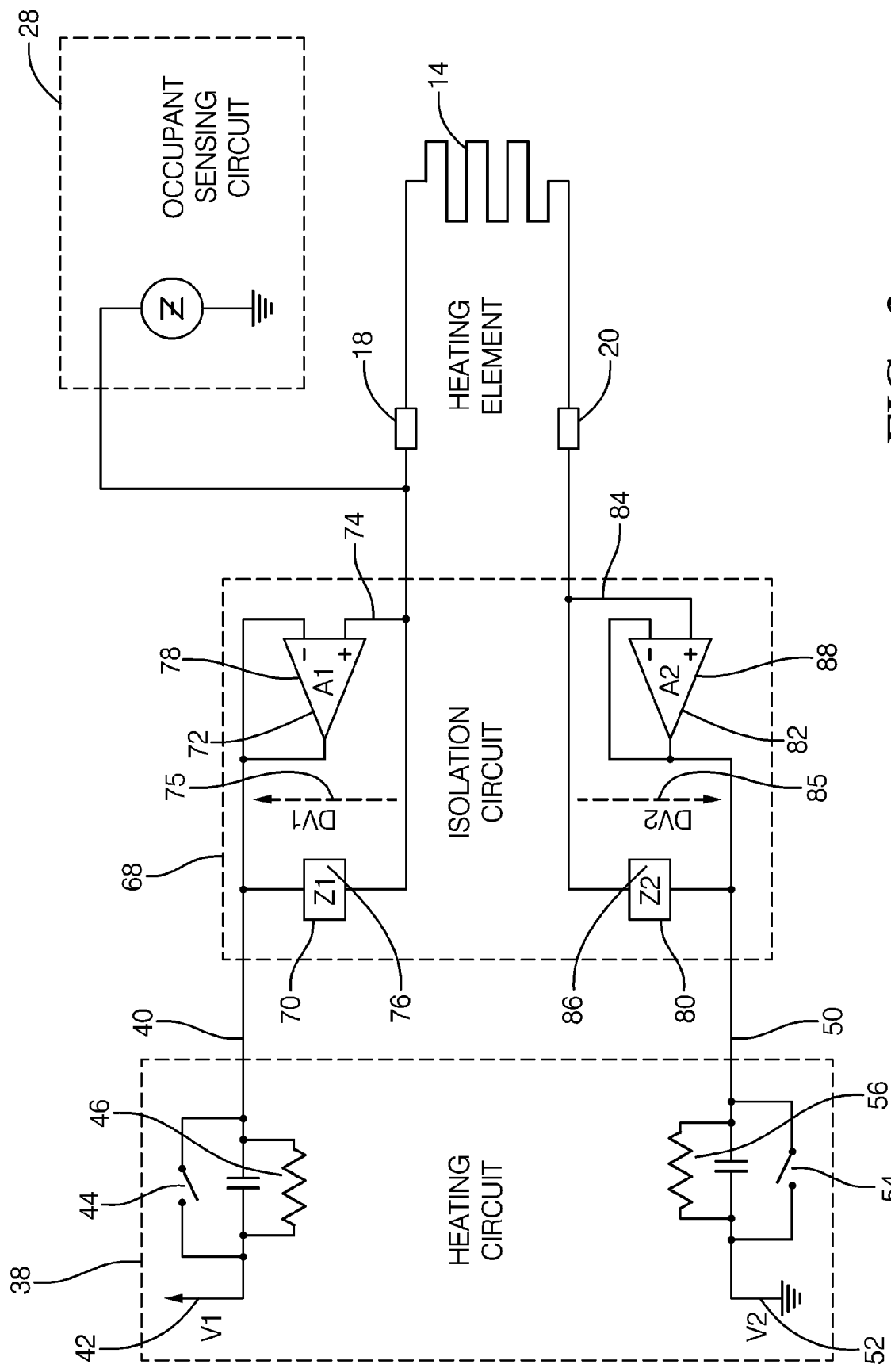
FIG. 3 is a block diagram of an occupant detection/seat heating system.

FIG. 3 is a block diagram showing the interconnections of a heating element 14, an occupant sensing circuit 28, a heating circuit 38, and an isolation circuit 68 interposed between heating circuit 38 and heating element 14. During the heating mode, the heating circuit applies a heating voltage, a source of heating current, to the heating element by closing a heater switch comprising first heater switch 44 and second heater switch 54. Current flows through first blocking impedance 76 and second blocking impedance 86, where the series resistances through each of the blocking impedances does not significantly impede the heating element from generating heat. During the periodic occupant sensing mode, switches 44 and 54 open to disconnect the heating voltage and make the heating element available for occupant sensing.

During occupant detection, sources of voltage indicated by first heating voltage 42 (V1) and second heating voltage 52 (V2) are disconnected by opening a heater switch combination comprising first heater switch 44 and second heater switch 54 respectively. While the heater switches are open, the field impedance of heating element 14 is measured by occupant sensing circuit 28 to detect the proximity of an object or occupant near the seating surface. A suitable system for detecting an occupant by measuring field impedance is described in U.S. patent application Ser. No. 12/150,439 by Hansen et al., filed May, 28, 2008, incorporated herein by reference. The occupant detection circuit uses the heating element like an antenna and measures electric field impedance of the heating element to determine the presence of an object or occupant near the seat assembly seating surface. The field impedance can be modeled as predominantly capacitive in nature, but can also exhibit a resistive characteristic in parallel and/or in series with the model capacitor. When the switch is open and heating current is disconnected, the switches still have open-switch impedances that would couple to the heating element to the heating voltages V1 and V2 if not for isolation circuit 68. To enhance the reliability of occupant detection determinations, it is desired to isolate the open-switch impedance of the heating circuit from the heating element, thereby preventing the open-switch impedance and the heater circuit from affecting the electric field impedance measurement. Then, while the occupant detection circuit is measuring impedance, only the field impedance is present in the measurement. This avoids the open-switch impedance from adding to the field impedance and influencing the impedance measurement, thereby reducing the reliability of an occupant determination based upon the impedance measurement.

The seat assembly with an occupant detection circuit and a seat heater circuit described herein alternates between the seat heating mode and occupant sensing mode. For example, the system may suitably operate for about 900 ms in the seat heating mode and about 100 ms in the occupant detection mode. During seat heating, a heating voltage is connected to heating element 14 so electrical heating current is supplied to the heating element, thereby heating seating surface 24. In an automobile, a typical heating voltage is 12 to 14V and a typical heating current is around 8 A. During occupant sensing, the heating voltage is disconnected so the electrical load presented by the heating voltage does not impair measurements made by the occupant detection circuit using the heating element.

The capacitive portion of the field impedance for an exemplary empty seat assembly shown in FIG. 1 is typically between about 50 pF and about 100 pF. When an occupant is present, the capacitive portion will increase by an amount dependent upon the occupant. By way of an example, an increase may be in a range from about 30 pF to about 80 pF. In view of these typical values, the field impedance measured by occupant sensing circuit 28 will be noticeably influenced by the heating circuit having first open-switch impedance 46 and/or a second open switch impedance 56. Accordingly, it is desired to eliminate current through the switches that would otherwise contribute to impedance and limit the field impedance measurement error caused by the heating circuit to less than 5 pF.

Isolation of the open-switch impedance is provided for by isolation circuit 68 as shown in FIG. 3. First electrical component 70 is interposed between heating element 14 and heating circuit 38. Component 70 conducts heating current from the heating circuit to the heating element during seat heating. Component 70 also provides first blocking impedance 76 to cooperate with first voltage source 72 for establishing first differential voltage 75 effective to isolate first open-switch impedance 46 from the occupant sensing circuit. First differential voltage 75 (DV1) is established by sensing reference voltage 74 at first terminal 18 and then applying a voltage relative to reference voltage 74 to first heater lead 40. It is desired to establish a differential voltage magnitude of less than about 1 mV (i.e.—within +/−1 mV), and preferably zero, across component 70, so that no current from the occupant sensing circuit will flow through component 70 and the heating circuit will be suitably isolated from the occupant sensing circuit.

In contrast, a significant differential voltage, for example, greater than +/−1 mV for example, may allow current from the occupant sensing circuit will flow through component 70, so may not be effective to isolate first open-switch impedance 46 from the occupant sensing circuit. Furthermore, variation in DV1 will allow current to flow if electrical component 70 has any capacitive characteristic.

First voltage source 72 shown in FIG. 3 is depicted as operational amplifier 78. An operational amplifier arranged as shown forms a suitable voltage source for establishing a differential voltage of zero across component 70. Operational amplifiers having sufficiently high input resistance and sufficiently low input capacitance to prevent the sensing of reference voltage 74 by the operational amplifier from affecting the occupant sensing circuit are readily available. Thus, the isolation circuit configuration shown is effective for isolating the heating circuit from the occupant sensing circuit.

First electrical component 70 can be a resistor, inductor, diode, or transistor. A resistor may be used for component 70 where the resistance value needs to be small enough to prevent excessive power loss thus making seat heating inefficient, but large enough to provide sufficient blocking impedance for effectively cooperating with the first voltage source. Alternately, a portion of the heating element 14 may serve as a resistor for component 70, thereby improving the efficiency of the seat heating system, by providing additional terminals for electrical contact with heating element 14 between the first and second terminals. In another embodiment, component 70 may be an inductor having some series resistance. When the signal applied by the occupant sensing circuit is an oscillating signal, the inductor will provide increasing blocking impedance as the frequency of the occupant sensing signal increases. In still another embodiment, a diode may be used for component 70, preferably a diode having a diode voltage of zero. A transistor can also be used for component 70, either arranged as a two terminal device so the transistor acts like a diode, or preferably arranged as a three terminal device where the transistor is turned on to facilitate conducting heating current and turned off to provide blocking impedance.

The previous descriptions regarding first heater switch 44, first open-switch impedance 46, first electrical component 70, first voltage source 72 and all other features shown in the upper portions of heating circuit 38 and isolation circuit 68 of FIG. 3 can also be applied to describe the operation of second heater switch 54, second open-switch impedance 56, second electrical component 80, second voltage source 82 in the lower portion of heating circuit 38 and isolation circuit 68.

Figure 4:
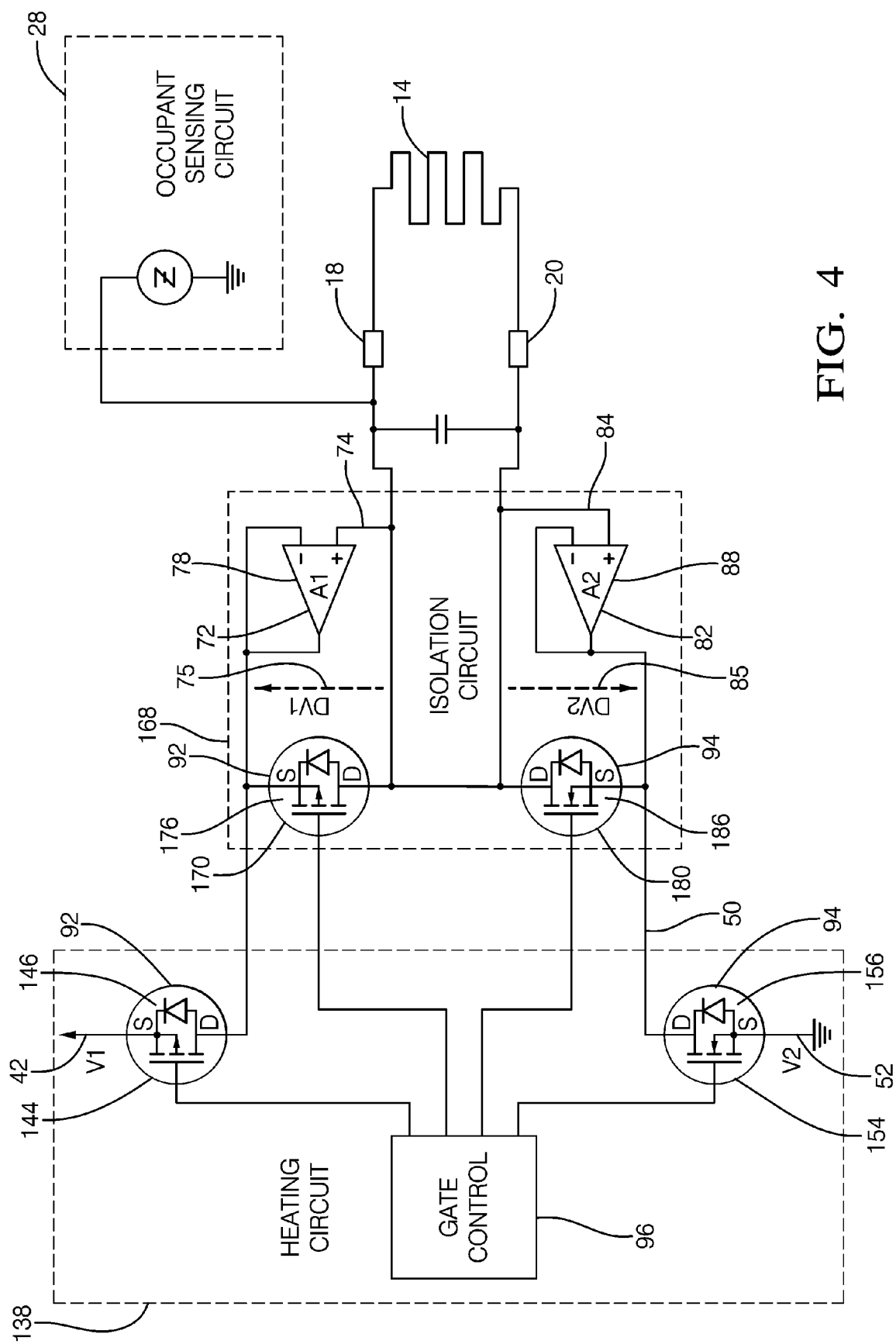
FIG. 4 is a schematic diagram of an occupant detection/seat heating system.

An exemplary embodiment is shown in FIG. 4 has P-channel MOSFET 92 being used as a first heater switch 144 for connecting to and disconnecting from a first voltage 42. It is known that transistors have capacitive and resistive characteristics coupling the drain to the source when in the OFF state. A suitable P-channel MOSFET 92 for controlling electric current supplied to seat heater 14 is an International Rectifier IRF7424. As depicted in FIG. 3, first open-switch impedance 46 equivalent capacitance can be approximated by using the typical output capacitance ($C_{OSS}$) of 580 pF listed in the transistor's data sheet. An equivalent resistance value can be approximated by noting the maximum Drain-to-Source Leakage Current of 25 uA with a Drain-to-Source voltage of 24V and calculating a leakage resistance of around 1MΩ. A similar value of capacitance and resistance would be present in a complementary N-channel MOSFET 94 used for controlling the connection to second voltage 154. In view of these values for characterizing the open switch impedance, it is readily apparent that the open-switch impedances need to be isolated from the field impedance, thereby completely eliminating any effect on the field impedance measured by occupant sensing circuit 28. It should also be noted that the parasitic characteristics of the transistors vary with applied voltage, temperature, manufacturing lot, etc., so simply adjusting the field impedance readings with a predetermined adjustment is not a practical alternative.

The states of the four transistors shown in FIG. 4 are controlled by a gate control 96. Heater switch 144 and 154 are biased to the ON state to supply heating current and biased to the OFF state during occupant sensing. Similarly electrical components 170 and 180 are biased to the ON state to facilitate conduction of heating current during seat heating and biased to the OFF state to providing blocking impedances 176 and 186 to cooperate with voltage sources 72 and 82 for isolating the heating circuit from the occupant sensing circuit.

Another feature of the exemplary embodiment in FIG. 4 is the use of a coupling capacitor 32 across first terminal 18 and second terminal 20. Coupling capacitor 32 improves the performance of the occupant sensing circuit by bypassing some of the resistive and inductive characteristic of heating element 14.

Thus, a seat assembly having seat heating circuit and occupant detection circuit using a heating element for both seat heating and occupant sensing, and isolating the heating circuit from the occupant detection circuit is provided. The seat assembly uses transistors for switching heater current, and isolates the open-switch impedance of the switch transistors from the occupant detection circuit, thereby preventing the open-switch impedance from affecting the accuracy of the occupant detection circuit.

While this invention has been described in terms of the preferred embodiments thereof, it is not intended to be so limited, but rather only to the extent set forth in the claims that follow. For example, it is to be appreciated that different kinds of transistors and devices other than transistors could provide adequate performance and different advantages.

We claim:

1. A seat assembly, comprising:
 a seat cushion having a seating surface;
 a heating element adjacent the seating surface formed of electrically conductive material, wherein the heating element includes a first terminal and a second terminal;
 a heating circuit coupled to the heating element for supplying an electrical current to the heating element effective for generating heat;
 an occupant sensing circuit coupled to the heating element and effective for sensing the presence of an occupant near the heating element;
 an isolation circuit interposed between the heating circuit and the heating element, said isolation circuit effective for isolating the heating circuit from the occupant sensing circuit, wherein the isolation circuit comprises a first electrical component coupling a first heater lead to the first terminal and a second electrical component coupling a second heater lead to the second terminal;
 a first heating voltage source connected to the first electrical component for applying a first voltage to the first terminal as a reference voltage for establishing a first differential voltage across the first electrical component; and
 a second heating voltage source connected to the second electrical component for applying a second voltage on the second terminal as a reference voltage for establishing a second differential voltage across the second electrical component, thereby isolating the heating circuit from the occupant sensing circuit.

2. The seat assembly in accordance with claim 1, wherein the heating element is formed of metal wire, conductive fiber, metal foil, or metal ribbon.

3. The seat assembly in accordance with claim 1, wherein the heating circuit further comprises a heating switch having an open-switch impedance;
 the heating switch having an closed state connecting one of the first and second heater leads to one of the first and second heating voltage sources for supplying electrical current to the heating element and an open state to disconnect the heater lead from the heating voltage source during occupant sensing, whereby the heating lead is coupled to the heating voltage source through the open-switch impedance.

4. The seat assembly in accordance with claim 1, wherein the occupant sensing circuit measures a field impedance of the heating element, said field impedance being indicative of an occupant near the seating surface.

5. The seat assembly in accordance with claim 1, wherein the first electrical component is a resistor, inductor, diode, or transistor.

6. The seat assembly in accordance with claim 1, wherein the first electrical component has a blocking impedance for cooperating with the first heating voltage source to establish the differential voltage.

7. The seat assembly in accordance with claim 1, wherein the first voltage source is an operational amplifier, said operational amplifier having an output and an inverting input contact the heater lead, said operational amplifier further having a non-inverting input contacting the heater element such that the differential voltage is zero.

8. The seat assembly in accordance with claim 1, wherein the isolation circuit effectively isolates the heating circuit when at least one of the first and second differential voltages is zero.

9. The seat assembly in accordance with claim 1, wherein the heating element includes a capacitor coupling the first terminal and the second terminal.

10. The seat assembly in accordance with claim 1, wherein the occupant sensing circuit is coupled to a terminal of the heating element.

11. The seat assembly in accordance with claim 1, wherein the heating circuit includes a first heating switch having a first open-switch impedance, and a second heating switch having a second open-switch impedance;

the first heating switch having a closed state connecting the first heater lead to the first heating voltage source, and the second heating switch having a closed state connecting the second heater lead to the second heating voltage source for supplying electrical current to the heating element; and the first heating switch having an open state disconnecting the first heater lead from the first heating voltage source, and the second heating switch having an open state disconnecting the second heater lead from the second heating voltage source during occupant sensing, whereby the first heating lead is coupled to the first heating voltage source through the first open-switch impedance and the second heating lead is coupled to the second heating voltage source through the second open-switch impedance.

12. The seat assembly in accordance with claim 1, wherein the first differential voltage magnitude is less than 1 millivolt and the second differential voltage magnitude is less than 1 millivolt.

13. The seat assembly in accordance with claim 1, wherein the first differential voltage is zero and the second differential voltage is zero.

14. The seat assembly in accordance with claim 1, wherein the first electrical component is a P-channel MOSFET, comprising a drain connected to the first terminal, a source connected to the first heater lead, and a gate biased so as to turn the P-channel MOSFET on while the first heater lead is connected to the first voltage source and off while the first heater lead is disconnected from the first voltage source; and the second electrical component is a N-channel MOSFET, comprising a drain connected to the second terminal, a source connected to the second heater lead, and a gate biased so as to turn the N-channel MOSFET on while the first heater lead is connected to the first voltage source and off while the first heater lead is disconnected from the first voltage source.

15. The seat assembly in accordance with claim 1, wherein the first heating voltage source is a first operational amplifier having an output and inverting input connected to the first heater lead, and further comprising a non-inverting input connected to the first terminal; and the second heating voltage source is a second operational amplifier having an output and inverting input connected to the second heater lead, and a non-inverting input connected to the second terminal.

* * * * *